United States Patent [19]
Taniquchi

[11] 3,845,563
[45] Nov. 5, 1974

[54] ENGINEERS

[76] Inventor: Umeyuki Taniquchi, 45-1040 D Wailele Rd., Kaneohe, Hawaii 96744

[22] Filed: Oct. 2, 1972

[21] Appl. No.: 294,388

[52] U.S. Cl. .................................................. 33/107
[51] Int. Cl. ............................................ G01b 3/06
[58] Field of Search ............. 33/107, 111, 105, 106

[56] References Cited
UNITED STATES PATENTS

| 418,968 | 1/1890 | Benzinger et al. | 33/107 |
| 564,204 | 7/1896 | Leeds | 33/108 |
| 1,277,873 | 9/1918 | Crate | 33/174 G |
| 1,497,492 | 6/1924 | Engel | 33/111 |
| 1,805,605 | 5/1931 | Thornburgh | 33/293 |
| 1,945,987 | 6/1932 | Ware | 33/107 |
| 2,365,735 | 12/1944 | Ware | 33/107 R |
| 2,645,019 | 7/1953 | Jones | 33/107 R |

FOREIGN PATENTS OR APPLICATIONS

| 601,823 | 5/1948 | Great Britain | 33/107 R |

Primary Examiner—Harry N. Haroian
Attorney, Agent, or Firm—James C. Wray

[57] ABSTRACT

A combined engineers'-architects' scale has three triangular scales joined by two hinges at longitudinal edges. Varied scale markings are machined along the several edges of the elements. The scales are identified by markings at the ends of the units for ease in selecting a particular desired scale.

7 Claims, 6 Drawing Figures

PATENTED NOV 5 1974 3,845,563
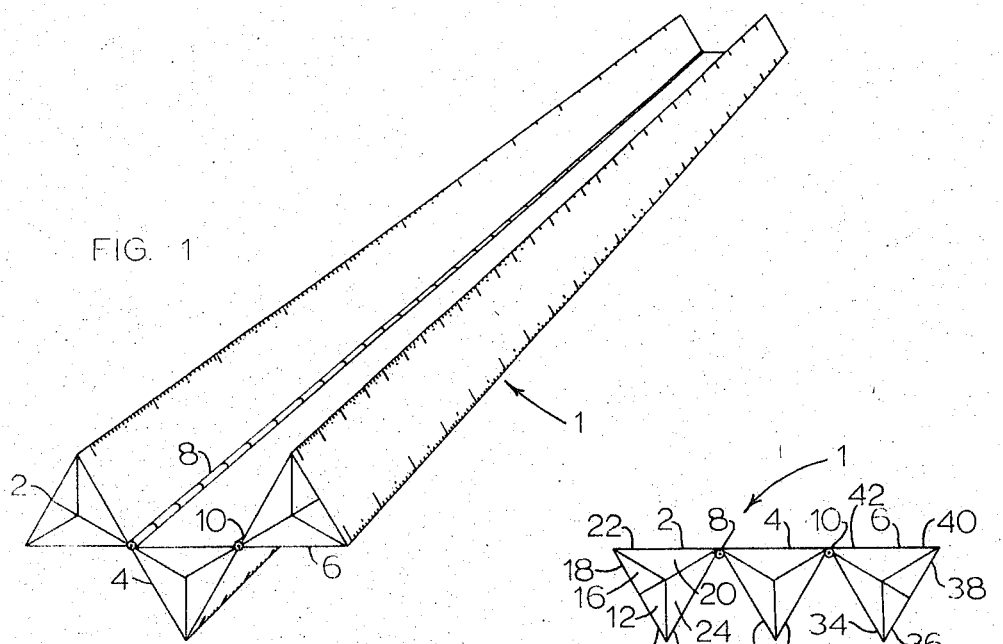
FIG. 1
FIG. 2
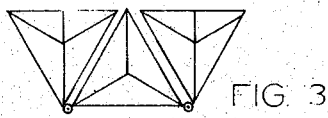
FIG. 3
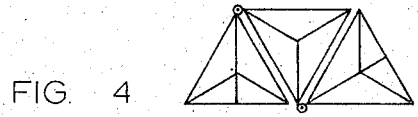
FIG. 4
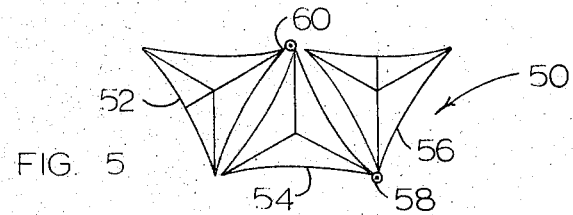
FIG. 5
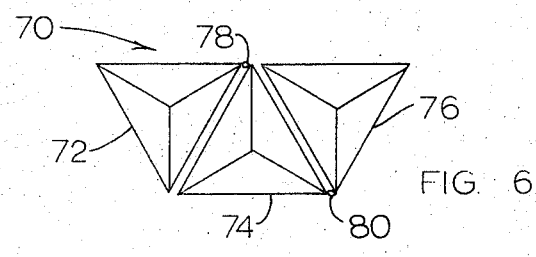
FIG. 6

ENGINEERS

BACKGROUND OF THE INVENTION

Engineers' scales and architects' scales are well known. The scales are usually triangular in cross section and have unique scales disposed along faces near longitudinal edges. In the conventional triangular scale, six such areas are provided. In an engineer's scale, markings for six separate scales are machined, one scale on each surface adjacent an edge. Conventional engineers' scales are marked for ten units, usually feet, to an inch and 20, 30, 40, 50 and 60 units to an inch.

An architect's scale usually has one surface with twelve inches, having machined divisions of sixteenths of an inch. The remaining five surfaces have two scales each, starting from opposite ends. Usually, the twelve inch or one foot scale is reduced so that, for example, one foot equals one inch, one-half inch, one-quarter inch or one-eighth inch, or so that one foot equals three inches, one and one-half inches, three-quarters inches, three-eighths inches, three-sixteenths inches or three-thirtyseconds inches. Divisions in feet read inward from a zero point, which is spaced from an edge of the scale area, and fine divisions which represent inches read outward from the zero point of the various scales.

Generally, land which is represented on maps, drawings and plats, is scaled to a conveniently selected scale from an engineer's scale with an inch representing tens of feet of land measurement. On the other hand, buildings are usually laid out according to scales chosen from an architect's scale, wherein fractions or multiples of one inch represent one foot.

One who works with both buildings and land must use architects' scales as well as engineers' scales. Use of two separate scales results in time-consuming hunting in choosing the desired instrument and in finding the correct alignment of the instrument when switching between separate architect and engineer scales. When placing one instrument down and picking up another instrument, the proper alignment and rotation of the new instrument must be made, again with the attendant use of time and distraction from the task.

No known scale has combined the conventional graduations from an architect's scale with the conventional graduations from an engineer's scale.

More than eighty years ago, a triangular rule with three relatively rotatable sections mounted between end plates was disclosed. That triangular rule did not combine common graduations from engineers's scales and architects' scales. The relative rotation of the sections rendered the learning of positions of the various graduations difficult, and the basic construction required continual maintenance of the useful range of balance between rotatability of the individual elements and rigidness of the scale. Apparently the triangular rule fell into disuse or never was used.

Rulers and drawing devices having graduated edge sections which are hinged for flipping up away from a drawing have been disclosed in an early patent.

The need persists for a scale which combines the conventional graduations of engineers' and architects' scales in a definite arrangement which can be conveniently used.

SUMMARY OF THE INVENTION

The present invention comprises three similar triangular scales which are hinged together at longitudinal edges. The instrument of the present invention has a plurality of unique scales which are arranged in predetermined relative positions on the instrument. The instrument may be folded along the hinges in several different manners to expose desired markings in a convenient manner or to juxtapose desired markings.

The broad objectives of the present invention are accomplished by placing the machine delineations of architects' scales and of engineers' scales on two elongated bodies having polygonal cross sections and connecting the bodies along longitudinal edges, whereby the bodies may be folded in different relationships for exposing and positioning selected markings and for juxtaposing selected markings. In the preferred embodiment of the invention, three triangular bodies are joined together with two longitudinal hinges at edges of the bodies. The hinges may be piano-type hinges or may be short spaced hinges. Alternatively, hinges may be constructed of long, pliable plastic strips which are connected between the bodies. The bodies may be formed of wood or may be integrally molded with the plastic strip hinges. Metal or plastic hinges may be employed with wood, plastic or metal bodies, and hinges may be molded or integrally formed with plastic or metal body members.

In one form of the invention, three triangular members lying flat with interposed hinges at the bottom may have successive markings along edge faces such as twelve inches in sixteenths of an inch, in one inch equals ten units, one inch equals thirty units, two inches equal one foot, one-half inch equals one foot, three inches equal one foot, three-fourths inch equals one foot, sixty feet equal one inch, one-fourth inch equals one foot, and one inch equals fifty feet. Other scales may be reversed and interposed along the same edges as is common in engineers' scales practice.

For convenience, so that the scales may rest flat when folded, accounting for the raised hinges, longitudinal surfaces of the scales may be slightly concave in a transverse direction.

One object of the invention is the provision of engineers' and architects' scale apparatus having combined engineers' and architects' scale markings on a single instrument.

Another object of the invention is the provision of elongated bodies having regular polygonal cross sections hinged together at longitudinal edges and having scale markings of engineers' and architects' measurements impressed thereon.

Another object of the invention is the provision of engineers' and architects' scale instruments having three bodies of triangular cross section hinged together at intermediate edges and having markings of engineers' and architects' scales along faces adjacent edges thereof.

Another object of the invention is the provision of end indicators of scale markings on plural hinged scale bodies.

These and other objects and features of the invention are apparent in the disclosure, which includes the foregoing and ongoing specification, the claims and the drawings.

BRIEF DESCRIPTION OF THE DRAWINGS

FIG. 1 is a perspective view of an engineers'-architects' scale constructed according to the present invention.

FIG. 2 is an end view of the scale shown in FIG. 1.

FIGS. 3 and 4 are end views of the scale shown in FIG. 1 folded in different configurations.

FIG. 5 is an end view detail of a scale having concave longitudinal surfaces.

FIG. 6 is an end view of a scale constructed with strip-type hinges.

DETAILED DESCRIPTION OF THE DRAWINGS

Referring to FIG. 1, an engineers'-architects' scale of the present invention is generally referred to by the numeral 1. In the embodiment shown in the drawings, the scale is made up of three elongated elements having similar polygonal cross sections, in this case, triangular cross sections. The elements are joined together by hinge means 8 and 10, which may be piano-type hinges mounted at longitudinal edges of the elements.

Elements 2, 4 and 6 are shown in extended position joined by hinges 8 and 10 in FIG. 2. As illustrated in the drawings, ends of the scales are divided with triangles. Within the triangular spaces, indications of the adjacent scales are imprinted, so that a desired scale may be immediately found.

For example, area 12 may have a marking "10", which would indicate that the scale along face 14 was divided in ten units per inch, which would represent ten feet per inch. Area 16 has a marking "30", indicating that the area 18 on the longitudinal face of the scale was divided in thirty units, or thirty feet per inch. The area 20 would have a marking "2", which would indicate two inches equal one foot in the adjacent scale on longitudinal edge surface 22. In area 24, a marking of "1" would indicate that a one foot scale along edge surface 26 had conventional inch and fractional inch divisions.

In the same manner scale element 4 has both ends divided in triangular sections with indications in the sections of the markings along scale areas 30 and 32. Triangular areas at ends of scale element 6 indicate corresponding machined divisions at longitudinal edge faces 34, 36, 38, 40 and 42.

In addition to the conventional scale markings found on engineers' and architects' scales, in a preferred embodiment, centimeter divisions are also provided. For example, centimeter divisions and conventional fractional inch divisions may be provided in the longitudinal surface area of element 4 between hinges 8 and 10.

The scale may be extended or folded in any manner prior to use or in use. FIGS. 3 and 4 show positions of the scales which may be desirable for juxtaposing scale markings or for conveniently positioning desired markings.

In FIGS. 3 and 4, the scale is shown inverted, that is, rotated 180° about an elongated axis with respect to the positions shown in FIGS. 1 and 2.

FIG. 5 shows a second embodiment 50 of an engineers' and architects' scale constructed according to the present invention. Longitudinal faces of the scale elements 52, 54 and 56 are concave so that when the scale is placed on a flat surface, it will not rock about either of hinges 58 and 60, which are mounted between adjacent longitudinal edges of the elements.

In the embodiment shown in FIG. 6, scale 70 has elements 72, 74 and 76 joined together by plastic strip hinges 78 and 80.

The scales shown in the drawings may be constructed of any suitable material, such as hard wood, preferably maple, metal or plastic. Hinges may be piano-type hinges, preferably of brass or other durable metal. Individual hinges may be spaced apart, or strip-type plastic hinges may be used.

Although the invention has been described with reference to specific embodiments, it will be obvious to those skilled in the art, that other embodiments may be constructed without departing from the scope of the invention, which is defined in the following claims.

I claim:

1. An engineer-architect's scale apparatus comprising first and second elongated scales having a plurality of longitudinal edges and having generally equilateral triangular cross-sections, unique related linear scale markings along the longitudinal edges and hinge means connected to longitudinal edges of the first and second scales, further comprising a third elongated scale coextensive with the first and second scales having a plurality of longitudinal edges having a equilateral triangular cross section and having unique scale markings along the longitudinal edges, and second hinge means connected to corresponding longitudinal edges of the first and third scales, thereby joining the first, second and third scales in a single foldable and reorientable unit.

2. The scale apparatus of claim 1 wherein the first, second and third coextensive scales have markings along all edges of tens of feet per inches and feet per fractional inches which are found on independent engineers' scales and architects' scales.

3. The apparatus of claim 1 wherein the scales have end faces, and further comprising equilateral triangular subdivisions with concurrent triangle legs on end faces terminating at apexes of the end faces, and indicators within the triangular subdivisions for indicating scale markings on longitudinal edge faces adjacent the triangular subdivisions.

4. The scale apparatus of claim 1 wherein the hinge means are coextensive with longitudinal edges of the scales.

5. The scale apparatus of claim 4 wherein the hinge means comprise piano-type hinges.

6. The scale apparatus of claim 4 wherein the hinge means comprises thin flexible plastic strips coextensive with longitudinal edges of the scales.

7. The scale apparatus of claim 1 wherein the markings comprise varied scale markings on all edges of tens of feet per inches and feet per fractional inches which are found on independent engineers' scales and architects' scales.

* * * * *